(12) United States Patent
Kuenz et al.

(10) Patent No.: US 10,112,744 B2
(45) Date of Patent: Oct. 30, 2018

(54) WIDE-NECKED PLASTIC CONTAINER FOR BULK MATERIAL, PRODUCED USING AN EXTRUSION-BLOW-MOLDING METHOD AND HAVING A CLOSURE CAP

(71) Applicant: Alpla Werke Alwin Lehner GmbH & Co. KG, Hard (AT)

(72) Inventors: Johann Kuenz, Hard (AT); Christa Westhofen, Dornbirn (AT); Israel Garcia Granados, Schwarzach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 4 days.

(21) Appl. No.: 15/049,426

(22) Filed: Feb. 22, 2016

(65) Prior Publication Data

US 2016/0167839 A1    Jun. 16, 2016

Related U.S. Application Data

(63) Continuation of application No. PCT/EP2014/002134, filed on Aug. 2, 2014.

(30) Foreign Application Priority Data

Aug. 21, 2013   (CH) .................................. 1432/13

(51) Int. Cl.
*B65D 39/00* (2006.01)
*B65D 43/14* (2006.01)
(Continued)

(52) U.S. Cl.
CPC .......... *B65D 43/0212* (2013.01); *B29C 49/04* (2013.01); *B29L 2031/716* (2013.01); *B65D 2543/00601* (2013.01)

(58) Field of Classification Search
CPC .... B65D 43/14; B65D 43/22; B65D 43/0212; B65D 2543/00601; B65D 2543/00611; B65D 2543/00722
See application file for complete search history.

(56) References Cited

U.S. PATENT DOCUMENTS

| | | | | |
|---|---|---|---|---|
| 1,538,848 A | * | 5/1925 | Dunnock | B65D 41/045 215/330 |
| 3,907,146 A | * | 9/1975 | Fields | B65D 41/18 215/317 |
| 4,190,170 A | * | 2/1980 | Boyd | B65D 51/1622 215/307 |
| 4,252,248 A | | 2/1981 | Obrist et al. | |

(Continued)

FOREIGN PATENT DOCUMENTS

| | | |
|---|---|---|
| DE | 10 2006 031599 A1 | 1/2008 |
| FR | 2 434 083 A1 | 3/1980 |

OTHER PUBLICATIONS

International Search Report (PCT/ISA/210) dated Sep. 12, 2014, by the European Patent Office as the International Searching Authority for International Application No. PCT/EP2014/002134.

(Continued)

*Primary Examiner* — Andrew T Kirsch
(74) *Attorney, Agent, or Firm* — Buchanan Ingersoll & Rooney PC

(57) ABSTRACT

A wide-necked extrusion blow-molded plastic container for bulk material as disclosed for a closure cap configured for mounting on a container neck of the wide-necked plastic container opening. A casing of the closure cap configured for connecting to an outside wall of a body of the wide-necked plastic container. A number of locking projections distributed over a periphery of the container neck which project from an outside wall of the container neck, and which are arranged on an outside wall of the container neck, the closure cap being equipped on an inside wall of its casing with corresponding locking recesses, which during mounting of the closure cap on the container neck engage with the (Continued)

locking projections to lock with one another in a non-detachable manner, the interacting locking projections and locking recesses being inaccessible in the mounted closure cap.

20 Claims, 3 Drawing Sheets

(51) Int. Cl.
*B65D 43/02* (2006.01)
*B65D 43/22* (2006.01)
*B65D 47/02* (2006.01)
*B65D 49/00* (2006.01)
*B29L 31/00* (2006.01)
*B29C 49/04* (2006.01)

(56) References Cited

U.S. PATENT DOCUMENTS

| | | |
|---|---|---|
| 4,349,174 A | 9/1982 | Obrist et al. |
| 2002/0017501 A1 | 2/2002 | Clements et al. |
| 2005/0077282 A1 | 4/2005 | Keller et al. |
| 2009/0101647 A1 | 4/2009 | Newberry et al. |
| 2010/0308066 A1 | 12/2010 | Perry et al. |
| 2011/0031734 A1* | 2/2011 | Bailey ............... B65D 41/0471 283/70 |
| 2011/0192847 A1 | 8/2011 | Vandamme |
| 2012/0219734 A1 | 8/2012 | Gill et al. |
| 2013/0001228 A1 | 1/2013 | Newberry et al. |
| 2014/0091092 A1 | 4/2014 | Newberry et al. |

OTHER PUBLICATIONS

Written Opinion (PCT/ISA/237) dated Sep. 12, 2014, by the European Patent Office as the International Searching Authority for International Application No. PCT/EP2014/002134.

* cited by examiner

WIDE-NECKED PLASTIC CONTAINER FOR BULK MATERIAL, PRODUCED USING AN EXTRUSION-BLOW-MOLDING METHOD AND HAVING A CLOSURE CAP

RELATED APPLICATION(S)

This application claims priority as a continuation application under 35 U.S.C. § 120 to PCT/EP2014/002134, which was filed as an International Application on Aug. 2, 2014 designating the U.S., and which claims priority to Switzerland Application 01432/13 filed in Switzerland on Aug. 21, 2013. The entire contents of these applications are hereby incorporated by reference in their entireties.

FIELD

The present disclosure relates to a wide-necked plastic container for bulk material, produced via extrusion-blow-molding and having a closure cap.

BACKGROUND INFORMATION

Containers made of tin or multicolored sheet metal, glass or else ceramic, common in the past, are increasingly being replaced by containers made of plastic. Recently, wide-necked plastic containers have been used for the packaging of fluid substances, for example bulk material for applications in the home, in agriculture, industry and trade, etc. The low weight and the lower costs play a significant role in this substitution. To this end, the use of recyclable plastic materials and the overall total energy balance in their production contribute to promoting the acceptance of wide-necked plastic containers by users.

Single-layer or multi-layer wide-necked plastic containers are often produced using so-called extrusion-blow-molding, such as a hose blowing method. The extrusion-blow-molding machines used for extrusion-blow-molding can have one or more extruders for feeding the required plastic material. The output of the extruder is connected to an extruder head, into whose exhaust nozzle—which can be regulated in the opening width—the extruded hose exits. The extruded plastic hose can be made in one or more layers. The hose that exits continuously or almost continuously from the exhaust nozzle is delivered to a blow-mold-tool arrangement and inflated by overpressure using a blow pin that is run into the molding cavity. Then, the inflated wide-necked plastic container is demolded from the molding cavity.

Bulk material, such as sugar, flour, coffee, powder for instant beverages, powdered milk, baby food, etc., is in many cases stored in wide-necked plastic containers, which have a large opening in relation to a periphery at the transition from the container shoulder to the container body, so that the removal of the bulk material, for example with a metering spoon, is facilitated. The container neck that has the opening can have a rotationally symmetrical—for example circular, square, rectangular, or oval—cross-section. It is understood that based on the manufacturing process, the "corners" of a square or rectangular neck section are designed actually rounded, i.e., have a radius. In general, a heat-sealing film is applied on the edge of the opening, for example glued or bonded, in order to close the container interior. The opening is ultimately covered by a closure cap, which can be pressed on the open end of the wide-necked plastic container. In this case, locking means that project from an inside wall of the closure cap engage behind corresponding stopping means, which are molded-on below the opening onto the outside wall of the container neck. In the case of a known wide-necked plastic container, the locking means that project from the inside wall of the closure cap are combined to form a single, annular circumferential rib. In an analogous way, the stopping means on the outside wall of the container neck are also designed as an annular circumferential stopping projection. The actual closure can be designed as, for example, a pivoting cover part or the like, which is hinged, for example, on the top of the closure cap.

In the case of wide-necked plastic containers with a circular cross-section of the container neck, in general a sufficiently good locking of the closure cap on the container neck is ensured. Also, the rotationally-symmetrical container neck facilitates the mounting of the closure cap by the relative orientation of the parts to one another in general playing no role. In the case of wide-necked plastic containers with a rectangular or oval container neck, however, the closure cap must be oriented correctly for mounting, so that the latter is not canted during pressing. In addition, the closure cap can be loosened relatively simply from the container by rotating it relative to the container. This is, of course, unacceptable in applications in which tamper resistance must be ensured. The consumer of a product that is dispensed in the wide-necked plastic container must be able to be confident that the container contents are present in the quality delivered by the dispenser and that the contents have not been tampered with. Therefore, in the case of such wide-necked plastic containers, additional locking devices are usually provided. The latter must, however, be manufactured very exactly and in precisely the correct location so that even in the most disadvantageous case of the manufacturing tolerances of the container neck and the closure cap, the play between the two parts remains small, so that a secure attachment of the closure cap to the container neck is ensured. Very stringent requirements, which directly correlate to elevated tool costs, follow for the tools for the production of the closure cap and for the blow-mold tools for the production of the wide-necked plastic container.

SUMMARY

A wide-necked extrusion blow-molded plastic container for bulk material is disclosed which comprises a closure cap configured for mounting on a container neck of the wide-necked plastic container opening. A casing of the closure cap is configured for connecting to an outside wall of a body of the wide-necked plastic container. A number of locking projections are distributed over a periphery of the container neck which project from an outside wall of the container neck, and which are arranged on an outside wall of the container neck, the closure cap being equipped on an inside wall of its casing with corresponding locking recesses, which during mounting of the closure cap on the container neck will engage with the locking projections to lock with one another in a non-detachable manner, the interacting locking projections and locking recesses being inaccessible in the mounted closure cap.

BRIEF DESCRIPTION OF THE DRAWINGS

Further advantages and features follow from the subsequent description of embodiments of the disclosure with reference to the diagrammatic drawings that are not to scale.

In the figures, the same components or elements are provided in each case with the same reference numbers.

DETAILED DESCRIPTION

Figure 1:
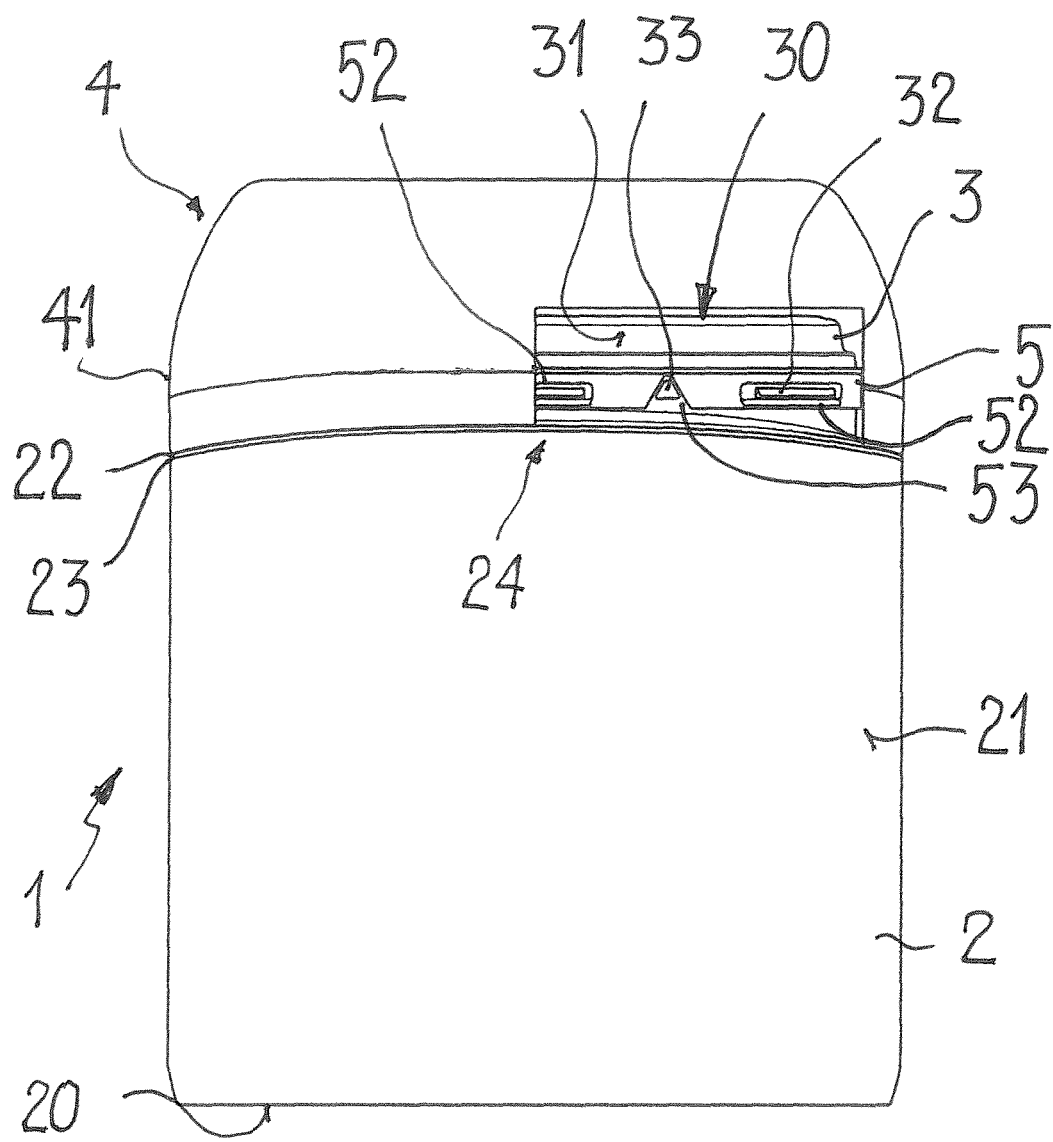
FIG. 1 shows an exemplary wide-necked plastic container for bulk material, produced using an extrusion-blow-molding method and having a mounted closure cap in a partial cutaway view.

A wide-necked plastic container produced using extrusion-blow-molding and a corresponding closure cap are disclosed whereby, even with a container neck that is not designed rotationally symmetrical, simple mounting of the closure cap in a precisely correct location is possible. As a wide-necked plastic container, a container is considered whose opening surface that is surrounded by an opening edge is larger than 30% of a container surface that is surrounded by a periphery at the transition from the container shoulder to the container body. The opening surface can, for example, possess 50%-60% of the container surface. The removal opening can in this case be sized in such a way that material stored in the container, such as bulk material, can be easily removed from the container by a device that is suitable for removal, such as, for example, a spoon, which can also be designed as a metering spoon. The position of the container for removal of the contents can be changed for this purpose; e.g., the container need not be tilted for removal of the material stored therein. A closure cap that is mounted on the container neck of a wide-necked plastic container is to remain securely in its mounted position and can be detached, in exemplary embodiment, only by destroying locking elements. This is to ensure that tampering with the closure part that is mounted on the container neck can be easily detected. The production of the wide-necked plastic container and the corresponding closure cap should not require any unduly expensive tools.

The achievement of these in part contradictory goals is for example achieved by a wide-necked plastic container, produced using an extrusion-blow-molding method and having a closure cap.

The closure cap can be mounted on a container neck that has a container opening and can be connected to the latter, whereby an essentially axially-extending section of the casing of the closure cap connects to an outside wall of a body of the wide-necked plastic container. A number of locking projections, which are distributed over a periphery of the container neck and project from the outside wall of the container neck, are arranged on an outside wall of the container neck. The closure cap has locking recesses that correspond to the locking projections, which recesses project from an inside wall of its casing. In the mounting of the closure cap on the container neck, the locking projections can be engaged with the locking recesses in such a way that they are connected non-detachably with one another. In the case of a closure cap that is mounted on the container neck, the interacting locking elements are inaccessible from the outside.

The locking projections and locking recesses that engage in one another form a non-detachable locking mechanism and act simultaneously as an anti-rotation lock. As a result, even in the case of non-rotationally-symmetrical container necks and closure caps, it is not possible to remove the closure cap simply by rotating the closure cap relative to the container neck. The mounted closure cap can be removed again only by destroying one or more of the locking elements, since the latter are inaccessible from the outside by the interaction of the container neck, the outside wall of the container body, and the casing of the closure cap, and accordingly also can no longer be loosened from one another. After the destruction of one or more of the locking elements, however, the closure cap can no longer be attached to the container neck. As a result, any tampering with the container can be easily detected.

In a variant embodiment, the outside wall of the container neck has at least a first centering element and the closure cap has at least a second centering element, projecting from its casing, which correspond to one another. The first and second centering elements that correspond to one another facilitate the orientation of the closure cap and thus the positioning of the locking elements in a precisely correct location when the closure cap is mounted on the container neck. The centering elements that interact with one another can also act as anti-rotation locks, which prevent a relative rotation of the closure cap opposite the container body. In this way, the locking elements that are locked with one another can be partially or completely relieved of the task of preventing rotation. The first centering elements on the container neck can be designed as centering projections or as centering recesses that are extended downward opposite the outside wall of the container neck. Accordingly, the second centering elements can be designed on the closure cap as corresponding centering recesses or as centering projections. The centering elements can also be designed in such a way that at the beginning of the mounting, the closure cap is pre-centered relative to the container neck. In the subsequent mounting, the closure cap can rotate relative to the container body until it has reached the correct position and it can no longer rotate relative to the container body at the end of the mounting.

The mounting of the closure cap in precisely the correct location can be facilitated in a variant embodiment in such a way that a number of the first centering elements, which interact with an equivalent number of corresponding second centering elements on the closure cap, are arranged on the container neck.

A variant embodiment can provide that the locking projections and the first centering elements are arranged alternately at least in certain areas along the periphery of the container neck. The corresponding locking recesses and the corresponding second centering elements are then provided alternately at least in certain areas on the inside wall of the casing of the closure cap. In such an arrangement, a best-possible centering and attachment of the closure cap to the container neck is ensured.

A further variant embodiment provides that the first centering element(s) is/are formed on the outside wall of the container neck as a centering projection or centering projections. The corresponding centering element or the second centering elements on the closure cap are accordingly designed as centering recesses.

Another variant embodiment provides that the locking projections in each case are designed as locking strips extending in the peripheral direction, which strips interact with window-like recesses in a skirt that projects from the inside wall of the closure cap. The skirt that projects from the inside wall can be designed essentially L-shaped. In this case, a first L-leg is non-detachably connected to the inside wall of the closure cap. The second L-leg extends essentially along the container neck and essentially parallel to and at a distance from the casing of the closure cap. The peripheral lengths of the locking strips and the width of the receiving window in the peripheral direction are matched to one another in such a way that virtually no rotation of the closure cap relative to the container body is possible. With the closure cap mounted, the locking strips on the container neck and the receiving window in the skirt projecting from the inside wall of the closure cap are covered by the casing thereof. Since the free edge of the casing connects essentially flush to the outside wall of the wide-necked plastic container or overlaps the latter, access to the locking elements is virtually precluded. Also, with a tool, for example with a knife or with the blade of a screwdriver, the locking elements cannot be reached from the outside without destroying the casing. This also facilitates in addition the detection of any tampering of the container or the closure cap.

The arrangement of the locking elements that are locked with one another is selected in such a way that the latter cannot be reached in the mounted state even through the opened cover of the closure cap. A removal of the closure cap is possible only with the destruction of at least one of the locking elements. In this way, however, the latter cannot be attached again to the container, and tampering of the container is immediately evident. The closure cap can also be designed in such a way that a cover is connected to a collar, which includes the casing and the skirt. The cover can be moved from a first position, in which it prevents access to the inside of the container, into a second position, in which access to a product decanted in the wide-necked plastic container is made possible through the container opening.

In a variant embodiment, the locking strips in the axial section can have an essentially triangular shape. In this case, the locking strips can include (e.g., consist of) an essentially radial locking surface and a sloped surface. The sloped surface extends from a maximum radial protrusion of the locking strip over the outside wall of the container neck obliquely in the direction of the container opening. The sloped surfaces facilitate the mounting of the closure cap by the edge of the skirt being guided along the sloped surfaces until the locking strips slide through the receiving windows in order to interact with the latter in a locking manner. The periphery of the side of the skirt facing the container neck is larger than the periphery of the outside wall of the container neck, but smaller than the maximum protrusion of the locking strips. While the edge of the skirt slides along the sloped surfaces during the mounting of the closure cap, its periphery is enlarged by the skirt being elastically widened. Because of the inherent elasticity of the skirt, the original periphery is reestablished as soon as the receiving windows have slid over the locking strips.

So that the forces that are to be applied on the container neck of the wide-necked plastic container when the closure cap is mounted remain within a reasonable order of magnitude, the oblique sloped surface and the essentially radial locking surface of any locking strip together enclose an angle that is, for example, approximately 25° to approximately 75°. In this case, the locking strips have a maximum radial protrusion that is, for example, approximately 0.5 mm to approximately 5 mm relative to the outside surface of the neck of the wide-necked plastic container.

To facilitate the mounting of the closure cap on the container neck of the wide-necked plastic container, in another variant embodiment, the skirt can be divided by axially extending indentations in strap-like segments, whereby for example each segment has a window-like recess. The division of the skirt, that is tightly connected to the casing of the closure cap and at a distance from the latter into strap-like segments, facilitates temporary peripheral enlargement in the mounting. As a result, less force is required to mount the closure cap on the container. It can also be provided that the axially extending indentations form at least in part the centering recesses. As a result, the number of axial indentations can be reduced, and excessive weakening of the dimensional stability of the skirt can be prevented.

According to another exemplary configuration, the indentations are arranged and embodied in such a way that during the mounting of the closure cap on the container neck, any segment can be moved in an elastically reversible manner independently of its adjacent segments from a first position into a second position. In the first position, the closure cap is prepared for mounting on the container neck. In the second position, the segment is maximally radially deflected during the mounting of the closure cap on the container neck by a locking projection in the direction of the casing. Because any segment can be deflected by itself and is unaffected by the adjacent segments, the impact forces for mounting the closure cap on the container body are minimized. Moreover, any segment can be extended individually along the outside wall of the container neck. Thus, manufacturing tolerances of the skirt and the container neck can be compensated by the segmentation. In addition, the segments can be configured in such a way that in the mounted state, they lie against the outside wall of the container neck under pretensioning. In this way, the closure cap can be attached to the container with zero play in the radial direction.

According to another exemplary configuration, the centering recess has an essentially equilateral triangular contour, whereby the two legs of the same length form a tip of the triangle, which is oriented opposite a mounting direction of the closure cap to the container neck. In this connection, the centering projection can be designed as, for example, a projecting triangle or a cylindrical pin. The centering is done when the casing surface of the cylinder or the leg of the projecting triangle lies against the legs of the first centering element.

Another variant embodiment can provide that each window-like recess has a chamfered lower boundary arm, which has an outside surface that extends from the recess obliquely in the direction of the casing of the closure cap. In this variant embodiment of the receiving window for the locking strips, it results virtually only in a line-like contact of the lower boundary arm, designed like a knife edge, with the locking surface of a locking strip. When there is traction on the closure cap, the locking action increases, since the lower boundary arm that is designed like a knife edge is interlocked or sunk into the transition between locking surface and outside wall of the container neck. If the traction is increased, the applied force can lead to a spreading of the edge of the lower boundary arm that faces away from the window-like recess in the direction of the casing of the closure cap, whereby the edge that faces away at the same time forms the boundary of the inside wall. When a predetermined tensile force is reached, the boundary arm can, for example, tear away from a beam of the window-like recess that extends its lateral fastenings per se in the direction of the center axis of the wide-necked plastic container. Of course, the fastening can be designed as a predetermined breaking point, which can be produced by, for example, material thinning. Predetermined breaking points, can, however, be established in principle at any position of the window-like recess.

The chamfered lower boundary arm of each receiving window can have an extension, measured in axial direction, which is for example approximately 1 mm to approximately 10 mm. The skirt has a wall thickness that is, for example, approximately 0.3 mm to approximately 2.5 mm. In an exemplary embodiment, the wall thickness of the skirt is 0.6 mm to 0.8 mm. With these dimensions, on the one hand, good locking with comparatively small mounting forces is ensured. On the other hand, because of the necessary high tensile forces to overcome the locking, this results in a destruction of lower boundary arms of the receiving window. This ensures that a closure cap that is mounted once and then forcibly detached again cannot be remounted and locked again on the container neck. In this way, tampering with the container can be reliably detected.

So that a mounting of the closure cap in precisely the correct location is ensured, it proves to be advantageous when each centering projection opposite the outside wall of the container neck has a radial protrusion that is, for example, approximately 0.5 mm to approximately 5 mm.

The outside contour of a centering element designed as a centering projection can in principle be arbitrarily designed. It proves advantageous, however, when each centering projection is designed like a pin with an essentially cylindrical outside contour. The cylindrical outside contour advantageously interacts with the slot-like centering recess. In an alternative variant embodiment, each centering projection has a triangular outside contour, whereby the tip of the triangle is oriented in the direction of the container opening. Both the cylindrical and the triangular outside contours prove especially suitable in particular in connection with a centering recess of triangular contour. In this case, the centering recess in general has a larger width at its mouth than at its end. As a result, the centering projections can slide very easily into the centering recesses even if the pre-positioning of the closure cap relative to the container neck is not done exactly. This reduces the effort for the positioning of the components.

A wide-necked plastic container that is to be equipped with a closure cap can be produced in principle according to various methods. The container can, for example, be produced through using an extrusion-blow-molding method. This allows a simple blow-forming of the connecting elements arranged on the container neck, in particular the locking strips and the centering projections. The closure cap can be produced using an injection-molding method. In this case, the casing of the closure cap and the skirt can be injected from similar plastics but also from plastics that are different from one another.

In FIG. 1, an example of a wide-necked plastic container for bulk material, for example sugar, flour, coffee, powder for instant beverages, powdered milk, baby food, etc., is provided with reference number 1. The wide-necked plastic container 1 has a container body 2, which can have a cross-section that is circular, square or that is different from a circle. The container body 2 is closed on its one longitudinal end with a container base 20. On the opposite longitudinal end, the container body 2 extends into a container neck 3, whose outside wall 31 has a smaller periphery than the container body 2. The container neck 3 ends in a relatively large container opening 30, which allows, for example, the removal of the bulk material with a metering spoon or the like. An opening surface that is surrounded by the edge of the container opening 30 is for example larger than 30% of a container surface that is bounded by a periphery 23 at the transition of the container shoulder 24 into an outside wall 21 of the container body 2. The opening surface is for example 50%-60% of the container surface. The wide-necked plastic container 1 that is depicted, for example, is produced overall by an extrusion-blow-molding method.

The wide-necked plastic container 1 carries a closure cap that is provided overall with the reference number 4. The closure cap 4 has a casing 41, which connects to the outside wall 21 of the container body 2. In the embodiment depicted in FIG. 1, the casing 41 of the closure cap 4 connects essentially flush to the outside wall 21 of the container body 2 and overlaps the container shoulder 24. The transition from the closure cap 4 to the container body 2 could also be designed in a stepped manner. A separating seam between the closure cap 4 and the container body 2 bears the reference number 22. The closure cap 4 is equipped with the actual closure for the wide-necked plastic container 1.

The latter can be, for example, a closure flap, which is fastened via a hinge to the casing 41 of the closure cap 4. In the figure, this closure is not depicted in more detail, since its configuration is not significant to the essence of the disclosure. In the mounted state, the closure cap 4 is tightly connected axially to the container body 2 and is secured against relative rotation with respect to the latter. In the cutaway area of the closure cap 4, locking elements 32, 52 that perform this function are indicated.

In the depicted embodiment, the locking elements include (e.g., consist of) locking projections 32, which project from an outside wall 31 of the container neck 3 and engage in corresponding locking recesses 52 that are omitted in a skirt 5, which projects essentially L-shaped from an inside wall of the casing 41 of the closure cap 4. It can be mentioned that locking recesses can also be provided on the outside wall of the container neck instead of locking projections. Accordingly, the corresponding locking elements on the skirt are then designed as locking projections. FIG. 1 also shows a centering element that is designed as a centering projection 33 and that engages in a corresponding centering recess 53 in the skirt 5. The locking elements 32 and 52 that correspond to one another and the centering elements 33 and 53 that correspond to one another simultaneously also perform the function of anti-rotation locks.

The centering elements 33, 53 are not absolutely necessary in order to ensure the functionality of the wide-necked plastic container 1 from the container body 2 and the closure cap 4 that is non-detachably connected to the container body 2. The centering elements 33, 53, however, offer advantages in the mounting of the closure cap 4 on the container body 2. Advantageously, the centering elements 33, 53 can be configured in such a way that at the beginning of the mounting, the closure cap 4 can rotate to a predetermined extent on the container body 2 of the closure cap 4 relative to the container body 2, although the centering elements 33, 53 at least in part are already engaged with one another. With increasing progress in mounting, the possible relative rotation between the container body 2 and the closure cap 4 is also reduced to a predetermined extent in order to allow essentially no further rotation after the mounting is completed. Because of the rotary attachment of the container body 2 to the closure cap 4 by the centering elements 33, 53, the locking elements 32, 52 no longer have to perform this task.

For the sake of completeness, it should also be mentioned that because of thermal expansion coefficients, relaxation of the plastics used, and manufacturing tolerances, an unintentional, slight relative rotatability between the container body 2 and the closure cap 4 may still be possible. This does not impair, however, the functionality of the wide-necked plastic container 1 that is provided with the closure cap 4. The closure cap 4 can be produced using an injection-molding method.

Figure 2:
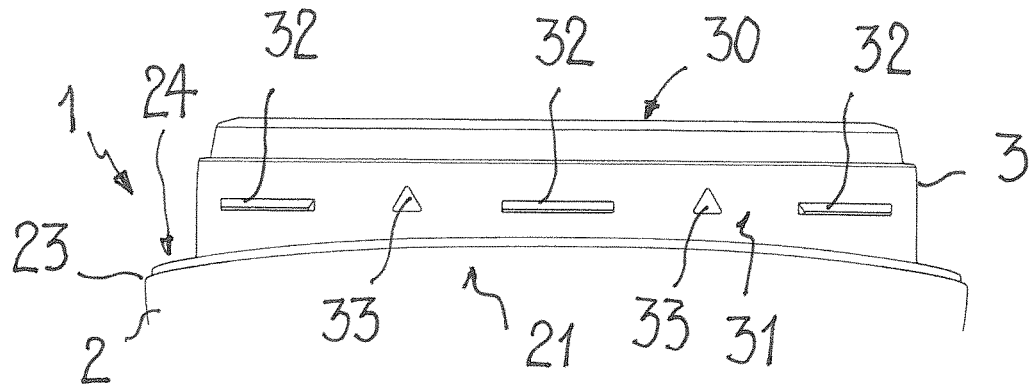
FIG. 2 shows a side view of a neck section of the wide-necked plastic container according to FIG. 1.

In FIG. 2, the container neck 3 and the container shoulder 24 are depicted as a transition to the container body 2 of the wide-necked plastic container 1. The same elements bear the same reference numbers as in FIG. 1. The locking projections 32 that project radially from the outside wall 31 of the container neck 3 are designed as locking strips that extend in the peripheral direction. The centering projections 33, which in the depicted embodiment project in a pin-like manner from the outside wall 31 of the container neck 3 and have an essentially triangular outside contour, are arranged between the locking strips 32. The locking strips 32 and the centering pins 33 can be provided alternately at least in certain areas along the container neck 3. They can, as is depicted in FIG. 2, be arranged at the same axial height of the container neck 3. They can also be provided, however, at different axial heights of the container neck 3. For example, one of the centering pins 33 could be moved closer to the container opening 30 in order to ensure a very early pre-orientation in the mounting of the closure cap.

From FIG. 2, it can be seen that the container neck 3 has a smaller periphery than the container body 2. The container shoulder 24 between the container neck 3 and the container body 2 can be designed in a graduated manner in order to achieve as uniform a transition of the casing (41 in FIG. 1) of the closure cap (4 in FIG. 1) to the outside wall 21 of the container body 2 as possible. The container shoulder 24 is curved in the direction of the container neck 3 in the depicted embodiment. For the container neck 3 in a medium section of its long side, this leads to a smaller length than on the side edges. The container shoulder 24, viewed in cross-section, can be curved in a circular manner or in the direction of the container base. With respect to the outline of the container shoulder, however, any other structural solutions are possible.

Figure 3:
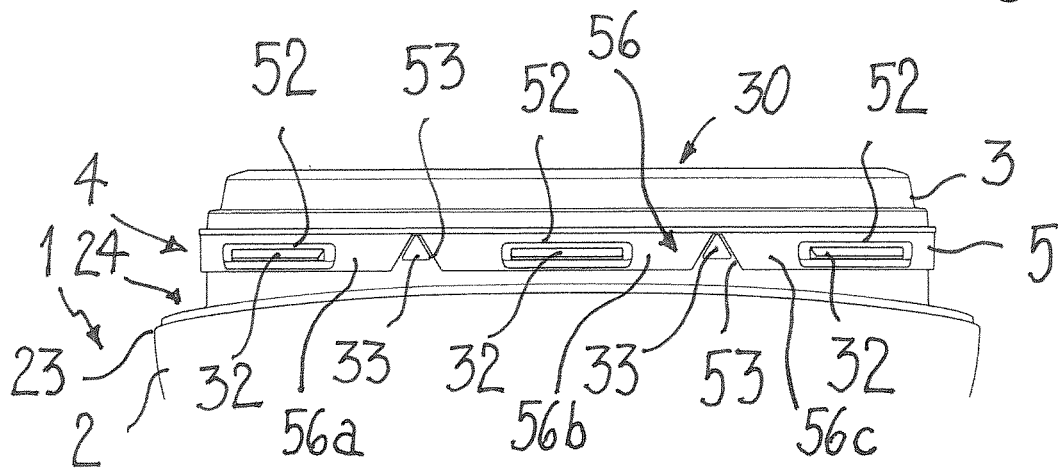
FIG. 3 shows a side view of the neck section of the wide-necked plastic container according to FIG. 2 with indicated locking recesses and centering elements of the closure cap.

FIG. 3 shows the container body 2 from FIG. 2 with a mounted closure cap 4. For the sake of greater clarity, the casing (41 in FIG. 1) of the closure cap 4 was omitted. FIG. 2 therefore shows only one section 56 of the skirt 5 that projects from the casing (41) of the closure cap 4. The locking strips 32 that project from the outside wall 31 of the container neck 3 are engaged with the window-like locking recesses 52 in the skirt 5 and are non-detachably connected thereto.

In the same manner, the centering projections 33 interact with the centering recesses 53 that are provided in the skirt 5. In this case, the centering recesses 53 are designed as slot-like indentations, which are made wider on the edge of the skirt 5 than on the closed end thereof. For example, corresponding to the outside contour of the centering projections 33, they have an essentially triangular contour.

The slot-like indentations divide the depicted section 56 of the skirt 5 into individual segments 56a, 56b, 56c, on which one window-like locking recess 52 each is made. The division of the depicted section 56 of the skirt 5 into individual segments 56a, 56b, 56c can ensure that the segments, here by way of example the segment 56b, can be deflected radially from the neutral position thereof, (e.g., toward the casing 41 or away from the casing 41), without an adjacent segment, here by way of example the segments 56a, 56c, being affected in this way. As a result, the mounting forces can be kept small, since a deflection of one segment 56b does not lead to a deflection or else a clamping of the adjacent segments 56a, 56c.

Thus, it is prevented that by deflecting one segment in the direction toward the casing 41, at least one partial area of the adjacent segment is pressed in a counterproductive manner in the opposite direction, away from the casing 41, which during mounting would lead to additional effort in order to move this adjacent segment into the original neutral position. Furthermore, the individual segments 56a, 56b, 56c that can be moved radially independently of one another can be more easily extended along a contour of the outside wall 31 of the container neck 3 and thus, for example, compensate for manufacturing tolerances between the contour of the skirt 5 and the contour of the outside wall 31.

The segments 56a, 56b, 56c can also be configured in such a way that after mounting, they lie against the outside wall 31 of the container neck 3 under pretensioning. In this way, it can be at least partially prevented that the closure cap 4 can be moved radially relative to the container body 2. Because of this pretensioning, it is possible to eliminate radial play that can arise due to the relaxation of the plastics used, temperature coefficients, or manufacturing tolerances.

Figure 4:
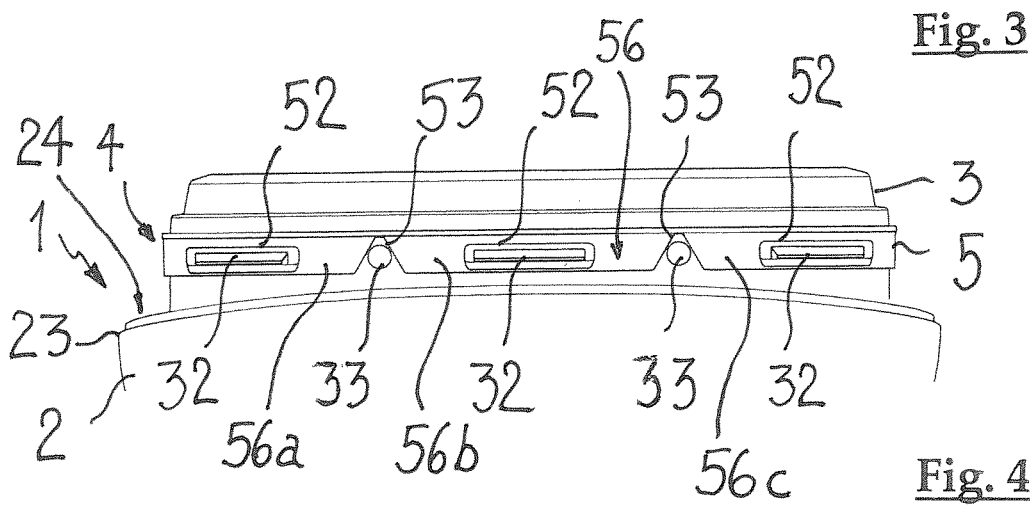
FIG. 4 shows an exemplary variant of a wide-necked plastic container in a view that is analogous to FIG. 3.

FIG. 4 shows a schematic depiction of a variant of the wide-necked plastic container 1 in a view analogous to FIG. 3. The same elements again bear the same reference numbers as in the preceding figures. The difference of the container body 2 of FIG. 4 to the container body in FIG. 3 is in the design of the centering projections 33. In the depicted embodiment, the latter are designed as centering pins with a cylindrical outside contour or with a circular cross-section. The other locking and centering elements correspond to those of FIG. 3.

Figure 5:
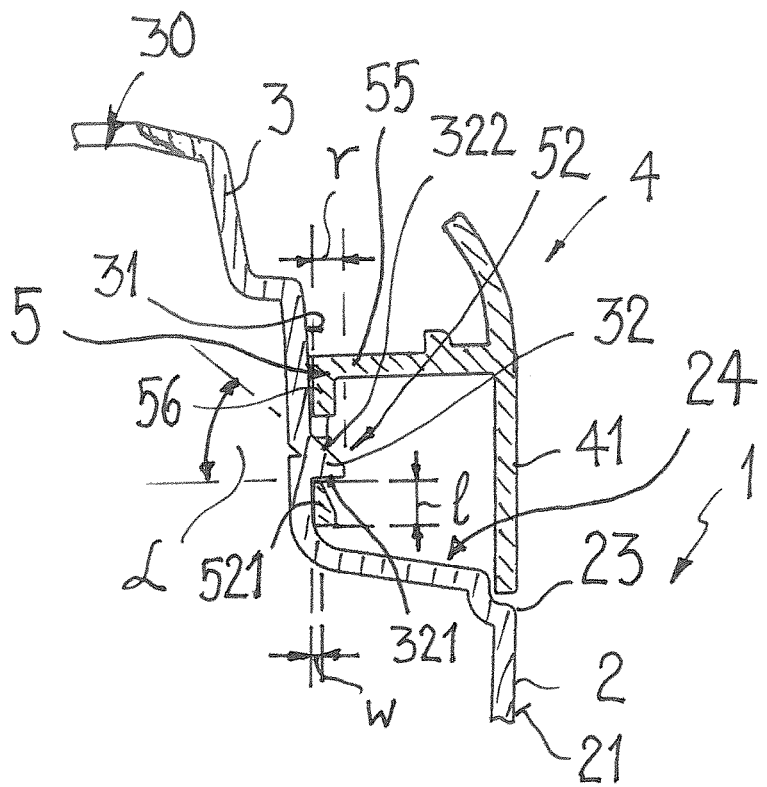
FIG. 5 shows an axial cutaway view of locking elements that interact with one another in case of a mounted closure cap.

In the axial cutaway depiction of FIG. 5, a wide-necked plastic container in turn bears the reference number 1. The container body is referred to as 2; the container neck bears the reference number 3. In the depiction, the closure cap 4 that is mounted on the container neck 3 is indicated. The casing 41 of the closure cap 4 extends essentially flush into the outside wall 21 of the container body 2. In this case, it is evident that the stepped transition from the container neck 3 to the container body 2 corresponds to approximately the wall thickness of the closure cap 4. A separating seam 22 can be detected between the closure cap 4 and the container body 2.

It is evident from the depiction that the locking projection 32 has an essentially triangular cross-section. The locking projection 32, such as a locking strip, can include (e.g., consists of) an essentially radial locking surface 321 and a sloped surface 322. The sloped surface 322 runs from the largest radial protrusion of the locking surface 321 opposite the outside wall 31 of the container neck 3 obliquely in the direction of the container opening 30 of the container neck 3. The largest radial protrusion r of the locking surface 321 is for example approximately 0.5 mm to approximately 5 mm. In this case, the sloped surface 322 and the locking surface 321 together enclose an angle $\alpha$ that is for example approximately 25° to approximately 70°. For example, the angle $\alpha$, as depicted, is approximately 45°. The groove in the inside wall of the container neck 3, at the level of the locking projection 32, is a result of extrusion-blow molding.

As is evident from FIG. 5, the skirt 5 has, for example, an L-shaped contour. In this case, a first L-leg 55 is non-detachably connected to the casing 41 and projects from the latter. The first L-leg 55 is connected to a second L-leg 56, which extends from the casing 41 some distance away along the outside wall 31 of the container neck 3. The window-like locking recess 52 in the second L-leg 56 of the skirt 5 has a chamfered lower boundary arm 521. To this end, an outside surface of the lower boundary arm 521 extends from the recess obliquely in the direction of the casing 41 of the closure cap 4. In the depicted variant embodiment of the receiving window for the locking strips, it results in an approximately line-like contact of the lower boundary arm 521, designed like a knife edge, with the locking surface 321 of the locking projection 32. Because of the inclination of the chamfered boundary arm 521, the locking action increases when there is traction, since the second L-leg 56 of the skirt 5 is drawn inward, in the direction of the outside wall 31 of the container neck 3.

The chamfered lower boundary arm 521 of the window-like locking recess 52 has, for example, an extension 1 that is measured in the axial direction and that is for example approximately 1 mm to approximately 10 mm. The lower boundary arm 521 has a minimum wall thickness w that is for example approximately 0.1 mm to approximately 2 mm. With these dimensions, on the one hand, good locking with comparatively small mounting forces is ensured. On the other hand, by applying high tensile force to supposedly overcome the locking, the lower boundary arm 521 of a receiving window 52 is irreparably destroyed. This ensures that a closure cap 4 that is mounted once and then forcibly detached cannot be remounted and locked again on the container neck 3. The chamfering of the lower boundary arm 521, depicted by way of example, can promote the interlocking with the locking strips 32. It can be pointed out that an adequate interlocking can also occur without chamfering of the lower boundary arm.

Figure 6:
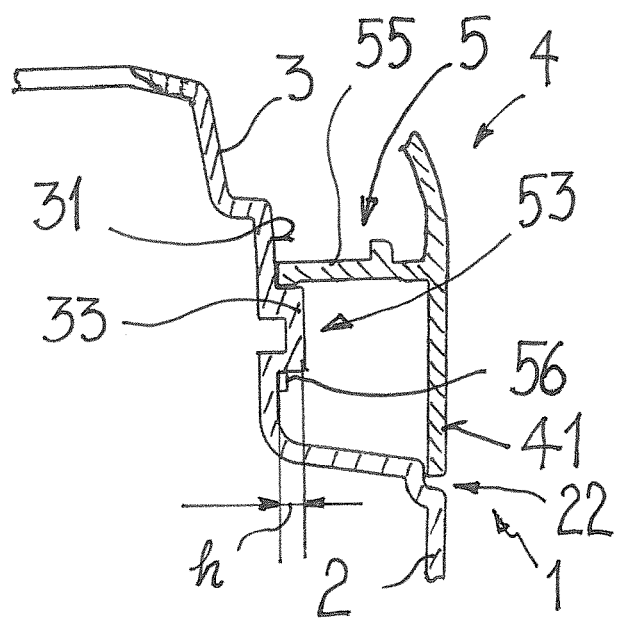
FIG. 6 shows an axial cutaway view of centering elements that interact with one another in case of a mounted closure cap.

FIG. 6 shows another axial cutaway depiction of a wide-necked plastic container 1 that is provided with a closure cap 4. In this case, the line of intersection runs through a centering projection 33. In turn, the same elements bear the same reference numbers as in the preceding FIG. 5. In the case of a mounted closure cap 4, the pin-like centering projection 33 and the centering recess 53 in the skirt 5, which projects from the casing 41 of the closure cap 4, interact. The centering projection 33 can have a triangular or a cylindrical outside contour with a round cross-section. The radial protrusion h of the centering projection 33 opposite the outside wall 31 of the container neck 3 is for example approximately 0.5 mm to 3.5 mm. The centering recess 53 has, for example, a triangular contour, which is indicated by the non-cross-hatched section of the skirt 5. Because of the curvature of the wide-necked plastic container 1 or the closure cap 4 in the peripheral direction, in this case the skirt 5 cannot be seen in its full wall thickness. In an alternative variant embodiment, the centering recess 53 can also have a simple rectangular contour. The groove in the inside wall of the container neck 3, at the level of the centering projection 33, is again a result of the extrusion-blow-molding process.

Embodiments have been explained by examples of a wide-necked plastic container 1, whose container body 2 has an elongated-oval cross-section that is different from a circle. It is understood, however, that the shape of the container body 2 has no effect on the function. Accordingly, the container body 2 can also be made circular or square. The locking projections 32 and locking recesses 52 that engage in one another act at the same time as a non-detachable axial locking mechanism and are used as an anti-rotation lock if this functionality is not taken over by the centering elements 33, 53. As a result, even in the case of non-rotationally-symmetrical container necks 3 and closure caps 4, a simple detachment of the closure cap 4 is not possible. The mounted closure cap 4 can be removed again only by destroying one or more of the locking elements 32, 52, since the latter are covered and are therefore inaccessible from the inside and from the outside. As a result, they can no longer be loosened from one another—even with the use of a tool, for example a knife or a screwdriver—without destroying the connection. The closure cap 4 can then, however, no longer be attached to the container neck. As a result, any tampering with the wide-necked plastic container 1 can be easily detected.

On the container neck 3, at least one centering projection 33, which interacts with a centering recess 53 on the closure cap 4, can be provided. As a result, a mounting of the closure cap 4 on the wide-necked plastic container 1 in precisely the correct location is ensured. Thus, even in the case of rotationally-symmetrical container necks 3 or closure caps 4, it is ensured that closures arranged on the closure cap 4 are always oriented in the same manner. It can also be pointed out that an alternative arrangement of locking projections and locking recesses can also be provided. Then, for example, on the periphery of the container neck, locking recesses in the form of indentations or setbacks are made in the outside wall of the container neck. The corresponding locking projections are then provided on the casing of the closure cap. For example, the locking projections can be made on the skirt that has an L-shaped contour and of which one L-leg is connected tightly to the inside wall of the casing and of which the second L-leg extends along the outside wall of the container neck. The skirt can be divided by axial indentations in strap-like segments, whereby for example each segment has at least one locking projection. Exemplary advantages of the segmenting of the skirt, explained herein, are also ensured in this variant embodiment.

A wide-necked plastic container as disclosed herein can be produced overall in an extrusion-blow-molding method from plastics that are suitable for the extrusion-blow-molding method. The closure cap can for example be produced using an injection-molding method. In this case, the casing of the closure cap and the skirt can also include or consist of different plastics.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A wide-necked extrusion blow-molded plastic container for bulk material, comprising:
    a closure cap configured for mounting on a container neck of a wide-necked plastic container opening;
    a casing of the closure cap adjoining an outside wall of a body of the wide-necked plastic container; and
    a number of locking projections distributed over a periphery of the container neck which project from an outside wall of the container neck, and which are arranged on the outside wall of the container neck, the closure cap being equipped with corresponding locking recesses, which during mounting of the closure cap on the container neck will engage with the locking projections to lock with one another in a non-detachable manner, the interacting locking projections and locking recesses being inaccessible in the mounted closure cap, the closure cap being configured to be removable after mounting only by destroying one or more of the locking recesses and/or locking projections;

wherein the locking projections are each configured as locking strips that extend in a peripheral direction and that interact with respective locking recesses, the locking recesses each being provided in a skirt that projects from an inside wall of the casing of the closure cap as a substantially L-shaped projection.

2. The wide-necked plastic container with a closure cap according to claim 1, comprising:
on the outside wall of the container neck, at least a first centering element; and
a second centering element, that corresponds to the at least one first centering element, on the casing of the closure cap, whereby in a mounting of the closure cap on the container neck, the at least one first centering element and the second centering element are configured to engage with one another in such a way that after the mounting, the closure cap and the container neck are centered relative to one another.

3. The wide-necked plastic container with a closure cap according to claim 2, comprising:
a number of first centering elements, and an equivalent number of corresponding second centering elements.

4. The wide-necked plastic container with a closure cap according to claim 3, wherein the locking projections and the first centering elements are arranged alternately at least in certain areas along the periphery of the container neck, and the locking recesses and the second centering elements are provided alternately at least in certain areas on the casing of the closure cap.

5. The wide-necked plastic container according to claim 4, wherein each first centering element is configured as a centering projection that projects from the outside wall of the container neck, and wherein each second centering element is configured as a centering recess.

6. The wide-necked plastic container with a closure cap according to claim 5, wherein each centering projection has a radial protrusion (h) relative to the outside wall of the container neck, which is 0.5 mm to 5 mm.

7. The wide-necked plastic container with a closure cap according to claim 5, wherein each centering projection is configured as a pin with an essentially cylindrical outside contour.

8. The wide-necked plastic container with a closure cap according to claim 5, wherein each centering projection has a triangular outside contour, whereby a tip of the triangle is oriented in a direction of the container opening.

9. The wide-necked plastic container with a closure cap according to claim 5, wherein each centering projection has an equilateral triangle shaped outside contour, whereby a tip of the triangle is oriented in a direction of the container opening.

10. The wide-necked plastic container with a closure cap according to claim 1, wherein the locking strips in an axial section have an essentially triangular shape and comprise:
an essentially radial locking surface and a sloped surface, which sloped surface extends from a maximum radial protrusion of the locking strip opposite the outside wall of the container neck obliquely in a direction of the container opening.

11. The wide-necked plastic container with a closure cap according to claim 10, wherein the radial locking surface relative to the oblique sloped surface enclose an angle ($\alpha$), which is 25° to 75°.

12. The wide-necked plastic container with a closure cap according to claim 1, wherein the locking strips have a maximum radial protrusion (r), which is 0.5 mm to 5 mm.

13. The wide-necked plastic container with a closure cap according to claim 1, wherein the skirt that projects from the inside wall of the casing of the closure cap is divided by axially extending indentations into strap-like segments, whereby each segment has a locking recess.

14. The wide-necked plastic container with a closure cap according to claim 13, wherein the axially extending indentations are arranged and configured such that in mounting of the closure cap on the container neck, any segment, independently of its adjacent segments is movable elastically reversibly from a first position into a second position, whereby in the first position, the closure cap is prepared for mounting on the container neck, and in the second position, the segment is maximally radially deflected during the mounting of the closure cap on the container neck by a locking element.

15. The wide-necked plastic container with a closure cap according to claim 13, wherein the axially extending indentations at least in part form centering recesses.

16. The wide-necked plastic container with a closure cap according to claim 15, wherein each centering recess has an essentially equilateral triangular contour, whereby two legs of a same length form a tip of a triangle, which is oriented to the container neck opposite a mounting direction of the closure cap.

17. The wide-necked plastic container with a closure cap according to claim 1, wherein each locking recess has a chamfered lower boundary arm, which has an outside surface that extends from the locking recess obliquely in a direction of the casing of the closure cap.

18. The wide-necked plastic container with a closure cap according to claim 17, wherein the chamfered lower boundary arm has an extension that when measured in an axial direction is 1 mm to 10 mm.

19. The wide-necked plastic container with a closure cap according to claim 1, wherein the skirt has a wall thickness (w) that is 0.3 mm to 2.5 mm.

20. A wide-necked extrusion blow-molded plastic container for bulk material, comprising:
a closure cap configured for mounting on a container neck of a wide-necked plastic container opening;
a casing of the closure cap adjoining an outside wall of a body of the wide-necked plastic container; and
a number of locking projections distributed over a periphery of the container neck which project from an outside wall of the container neck, and which are arranged on the outside wall of the container neck, the closure cap being equipped with corresponding locking recesses, which during mounting of the closure cap on the container neck will engage with the locking projections to lock with one another in a non-detachable manner, the interacting locking projections and locking recesses being inaccessible in the mounted closure cap, the closure cap being configured to be removable after mounting only by destroying one or more of the locking recesses and/or locking projections;
wherein the locking projections are each configured as locking strips that extend in a peripheral direction and that interact with respective locking recesses, the locking recesses each being provided in a skirt that projects inward from an inside wall of the casing of the closure cap.

* * * * *